United States Patent
Liao et al.

(10) Patent No.: US 12,235,529 B2
(45) Date of Patent: Feb. 25, 2025

(54) CHOLESTERIC LIQUID CRYSTAL DISPLAY

(71) Applicant: IRIS OPTRONICS CO., LTD., Tainan (TW)

(72) Inventors: Chi-Chang Liao, Tainan (TW); Junji Tomita, Atsugi (JP)

(73) Assignee: IRIS OPTRONICS CO., LTD., Tainan (TW)

( * ) Notice: Subject to any disclaimer, the term of this patent is extended or adjusted under 35 U.S.C. 154(b) by 0 days.

(21) Appl. No.: 18/641,317

(22) Filed: Apr. 19, 2024

(65) Prior Publication Data

US 2024/0353699 A1    Oct. 24, 2024

Related U.S. Application Data

(60) Provisional application No. 63/460,593, filed on Apr. 19, 2023.

(51) Int. Cl.
| | |
|---|---|
| *G02F 1/1347* | (2006.01) |
| *G02F 1/133* | (2006.01) |
| *H01G 9/20* | (2006.01) |
| *G02F 1/1335* | (2006.01) |

(52) U.S. Cl.
CPC ...... *G02F 1/13324* (2021.01); *G02F 1/13478* (2021.01); *H01G 9/2027* (2013.01); *G02F 1/133512* (2013.01); *G02F 2203/02* (2013.01); *G02F 2203/05* (2013.01)

(58) Field of Classification Search
CPC ............. G02F 1/13324; G02F 1/13478; G02F 1/133512; G02F 2203/02; H01G 9/2027
See application file for complete search history.

(56) References Cited

U.S. PATENT DOCUMENTS

| | | |
|---|---|---|
| 6,518,944 B1 | 2/2003 | Doane et al. |
| 6,597,419 B1 | 7/2003 | Okada et al. |
| 7,733,447 B2 | 6/2010 | Tomita et al. |
| 2005/0094040 A1* | 5/2005 | Wang ............... G02F 1/133621 349/19 |
| 2009/0009710 A1* | 1/2009 | Nirmal ............... G02F 1/13718 349/167 |
| 2011/0170037 A1* | 7/2011 | Nirmal ............... H04N 9/3108 349/68 |
| 2012/0274887 A1 | 11/2012 | Hwang et al. |
| 2013/0222749 A1 | 8/2013 | Chiang et al. |
| 2021/0165255 A1 | 6/2021 | Liao et al. |
| 2023/0146964 A1* | 5/2023 | Oka .................... G02F 1/13718 136/252 |

* cited by examiner

*Primary Examiner* — James A Dudek
(74) *Attorney, Agent, or Firm* — Cheng-Ju Chiang

(57) ABSTRACT

A cholesteric liquid crystal display comprising red, green, and blue cholesteric liquid crystal modules. It further comprises a first thin-film photovoltaic module disposed between the blue and the green cholesteric liquid crystal modules, and a second thin-film photovoltaic module disposed between the green and the first selective light reflection modules. The first thin-film photovoltaic module is partially photo-permeable in which the transmittance of blue light is lower than the transmittance of the other lights. It IS preferably a dye sensitized solar cell module which specifically responsible for harvesting blue light. The second thin-film photovoltaic module is partially photo-permeable in which the transmittance of green light is lower than the transmittance of the other lights. It is preferably a dye sensitized solar cell module which specifically responsible for harvesting green light.

20 Claims, 2 Drawing Sheets

CHOLESTERIC LIQUID CRYSTAL DISPLAY

CROSS REFERENCE TO RELATED APPLICATIONS

The present invention claims benefit of U.S. Provisional Application No. 63/460,593, filed on Apr. 19, 2023, the disclosure of which is incorporated by reference herein.

BACKGROUND OF THE INVENTION

1. Field of the Invention

The present invention pertains to the field of liquid crystal display technology, and in particular to the optical structure of a cholesteric liquid crystal display.

2. Description of Related Art

A cholesteric liquid crystal display device has a planar texture reflecting an external light or a focal conic texture transmitting an external light, depending on an electric field to be applied. Even if an electric field is not maintained in a specific texture, the cholesteric liquid crystal display device can maintain the corresponding texture. Thus, the cholesteric liquid crystal display device has bistability. Based on the bistability, the cholesteric liquid crystal display device has been utilized as an e-paper display.

The cholesteric liquid crystal display device is capable of displaying colors depending on pitches of molecules contained in a liquid crystal layer and a wavelength of an incident light. U.S. Pat. No. 6,597,419B1 shows a related prior art. A reflective type multilayer liquid crystal display has a blue liquid crystal light control layer, a green liquid crystal light control layer, and a red liquid crystal light control layer stacked in this order from a viewing side. The half width of a reflection spectrum of any of the liquid crystal light control layers is larger than that of the adjoining liquid crystal light control layer on the viewing side. Further, the maximum reflectance of the reflection spectrum of any of the liquid crystal light control layers is higher than that of the adjoining liquid crystal light control layer on the viewing side. In one embodiment, the chromaticity coordinate position, in the XYZ colorimetric system, of a color displayed when all the liquid crystal light control layers are in a state of reflecting at the maximum reflectance is present in a range within a distance of 0.02 from the chromaticity coordinate position of the standard white point.

Another prior art of reflective type multilayer liquid crystal display is shown in U.S. patent application No. 20120274887A1. A cholesteric liquid crystal display device including a first liquid crystal panel containing a first cholesteric liquid crystal substancecrystal material for reflecting a light of a first color, a second liquid crystal panel containing a second cholesteric liquid crystal substancecrystal material for reflecting a light of a second color, a third liquid crystal panel containing a third cholesteric liquid crystal substancecrystal material for reflecting a light of a third color, a light absorption layer combined to a lower portion of the third liquid crystal panel, a first double-sided adhesive buffer layer configured to combine the second liquid crystal panel to a lower portion of the first liquid crystal panel and a second double-sided adhesive buffer layer configured to combine the third liquid crystal panel to a lower portion of the second liquid crystal panel.

For improving the image quality, a prior art of U.S. patent application No. 2013222749A1 is shown. A reflective liquid crystal display device includes an upper substrate, a lower substrate, a plurality of isolation structures, and a plurality of photoreactive liquid crystals. The lower substrate is disposed opposite to the upper substrate. The isolation structures are disposed between the upper substrate and the lower substrate for forming a plurality of channels between the upper substrate and the lower substrate. Each of the photoreactive liquid crystals is disposed in each of the channels. The upper substrate is used to block ultraviolet.

U.S. patent application No. 20210165255A1 shows another prior art for improving the image quality of a reflective cholesteric liquid crystal display. The display unit includes an upper transparent substrate, a lower substrate, an upper transparent electrode pattern formed on the upper transparent substrate, a lower transparent electrode pattern formed on the lower substrate, a cholesteric liquid crystal layer sandwiched between the upper transparent electrode pattern and the lower transparent electrode pattern, and a light absorbing layer formed on the upper transparent substrate. The cholesteric liquid crystal layer is used for generating a visible light including a wavelength range. The light absorbing layer is used for absorbing light outside the wavelength range, so that the visible light in the wavelength range passes through the light absorbing layer and the upper transparent substrate. Based on the above, the reflective cholesteric liquid crystal display is shown to reduce the emission of the light outside a specific wavelength range (e.g., first wavelength range) for improving image quality by using at least one light absorbing layer.

U.S. Pat. No. 6,518,944B1 shows another prior art. The structure of a layered color display in a bistable cholesteric liquid crystal layer has a transparent mode and a reflective mode, in which a black solar cell is placed in the bottom layer. It is characterized by the ability to efficiently generate electricity because solar cells can be placed the same size as the display screen. It is stated that large solar cells can only be applied to cholesteric liquid crystals because other display systems cannot place black solar cells under the display surface.

U.S. Pat. No. 7,733,447B2 shows another prior art. A layered color display structure uses a bistable cholesteric liquid crystal layer, in which a blue-absorbing layer is disposed between the top blue reflective layer and the green reflective layer below. It is also stated that a layer that absorbs green light is disposed between the green reflective layer and the lowermost red reflective layer. It is stated that this configuration can reduce unnecessary display colors and greatly improve display quality.

SUMMARY OF THE INVENTION

An object of the present invention is to provide a reflective multilayer cholesteric liquid crystal display device that has better image quality and is capable of self-power generation. More specifically, in the prior art of the above-mentioned U.S. Pat. No. 7,733,447B2, even if the solar cell mentioned in the above-mentioned U.S. Pat. No. 6,518,944B1 is placed at the bottom layer, two absorption layers of blue and green are arranged. As a result, the black solar cells placed on the bottom layer did not receive enough light and were unable to generate electricity efficiently. The present invention is a new structure that allows combining the features of these two prior art technologies to provide more features and functionality.

In order to achieve at least one of the aforementioned objectives, one embodiment of the present invention provides a cholesteric liquid crystal display. The cholesteric liquid crystal display comprises a first selective light reflection module, a second selective light reflection module, and a third selective light reflection module, which sequentially stacked from bottom to top. For example, the first selective light reflection module is a red cholesteric liquid crystal module, the second selective light reflection module is a green cholesteric liquid crystal module, and the third selective light reflection module is a blue cholesteric liquid crystal module.

The incident light goes into the cholesteric liquid crystal display from the top of the third selective light reflection module. The wavelength ranges of first light, second light, and third light are different. For example, first light is red light, second light is green light, and third light is blue light.

The cholesteric liquid crystal display further comprises a first thin-film photovoltaic module and a second thin-film photovoltaic module. The first thin-film photovoltaic module, preferably as a dye sensitized solar cell module, is disposed between the second selective light reflection module and the third selective light reflection module. The second thin-film photovoltaic module, also preferably as a dye sensitized solar cell module, is disposed between the first selective light reflection module and the second selective light reflection module.

The incident light goes into the first thin-film photovoltaic module from the lower surface of the third selective light reflection module and the upper surface of the first thin-film photovoltaic module. The first thin-film photovoltaic module is partially photo-permeable in which the transmittance of third light is lower than the transmittance of the other lights. It means that most third light going into the first thin-film photovoltaic module is absorbed.

The incident light goes into the second thin-film photovoltaic module from the lower surface of the second selective light reflection module and the upper surface of the second thin-film photovoltaic module. The second thin-film photovoltaic module is also partially photo-permeable in which the transmittance of second light is lower than the transmittance of the other lights. It means that most second light going into the second thin-film photovoltaic module is absorbed.

Via the first thin-film photovoltaic module, the leaked third light which passed through the third selective light reflection module is absorbed by the first thin-film photovoltaic module and applied for generating additional electricity. The remaining light then going into the second selective light reflection module for reflection is therefore much clear. Via the second thin-film photovoltaic module, the leaked second light which passed through the second selective light reflection module is absorbed by the second thin-film photovoltaic module and applied for generating additional electricity. The remaining light then goes into the first selective light reflection module for reflection is therefore much clear. Hence, the image quality of the cholesteric liquid crystal display is improved while additional electricity is generated for use.

In order to achieve at least one of the above-mentioned objectives, an additional embodiment of the present invention provides another cholesteric liquid crystal display. The cholesteric liquid crystal display comprises a first cholesteric liquid crystal module and a second cholesteric liquid crystal module, which sequentially stacked from top to bottom. The incident light goes into the cholesteric liquid crystal display from the top of the first cholesteric liquid crystal module.

The first cholesteric liquid crystal module reflects a first light while the second cholesteric liquid crystal module reflects a second light. The wavelength range of the second light is different from the wavelength range of the first light.

The cholesteric liquid crystal display further comprises a first thin-film photovoltaic module disposed between the first cholesteric liquid crystal module and the second cholesteric liquid crystal module.

The incident light goes into the first thin-film photovoltaic module from the lower surface of the first cholesteric liquid crystal module and the upper surface of the first thin-film photovoltaic module. The first thin-film photovoltaic module is a dye sensitized solar cell module. The first thin-film photovoltaic module is partially photo-permeable in which the transmittance of the first light is lower than the transmittance of the other lights, more particularly, the second light.

Via the first thin-film photovoltaic module, the leaked first light which passed through the first cholesteric liquid crystal module is absorbed by the first thin-film photovoltaic module and applied for generating additional electricity. The remaining light then going into the second cholesteric liquid crystal module for reflection is therefore much clear. Hence, the image quality of the cholesteric liquid crystal display is improved while additional electricity is generated for use.

The aforementioned illustrations are exemplary for the purpose of explaining the scope of the present invention. Other objectives and improvements related to the present invention will be illustrated in the subsequent descriptions and corresponding drawings.

BRIEF DESCRIPTION OF THE DRAWINGS

The foregoing features of the present invention may be combined with the following drawings in various combinations without exclusivity, unless expressly indicated otherwise. Apparently, descriptions of drawings in the following may be some of embodiments of the present invention, those of ordinary skill in the art may derive other drawings based on the following drawings without unduly experiments.

DETAILED DESCRIPTION OF THE PREFERRED EMBODIMENTS

It should be understood that the structures and associated functions in the following detailed descriptions are exemplary for the purpose of further explaining the scope of the present invention. However, the present invention may be embodied in various equivalent modifications, and descriptions and illustrations are not-limiting.

It also should be understood that the term used herein in embodiments to describe direction in terms of "central", "lateral", "up", "down", "right", "left", "upright", "horizontal", "top", "bottom", "inside", and "outside" are used to illustrate the present invention and for clarity. It does not hint or imply that device or part mentioned should be assembled or operated in strictly specific direction or setting. In addition, the terms "first" and "second" are also for descriptive purpose. It does not imply the strict amount. Technical features with terms "first" or "second" would illustrate or imply that one or more technical features can be included. As to detailed description of the present invention, the term "plural" and "a plurality of" indicates the amount of two or more.

Also in detailed descriptions of the present invention, it will be noted that the term "assemble", "connected to", "connected" should be explained and understood in the broadest way, unless the context clearly indicates otherwise. For example, the term "connected" indicates that two parts may be "fixed connected" or "detachably connected" or "integrally connected". Similarly, the term "connected" also indicates that two parts may be "mechanically connected" or "electrically connected", and "directly connected", "connected by intermediate part" or "internally connected by two parts". Alterations or modifications of the terms mentioned above will be no doubt understood and obvious to those of ordinary skill in the art.

Figure 1:
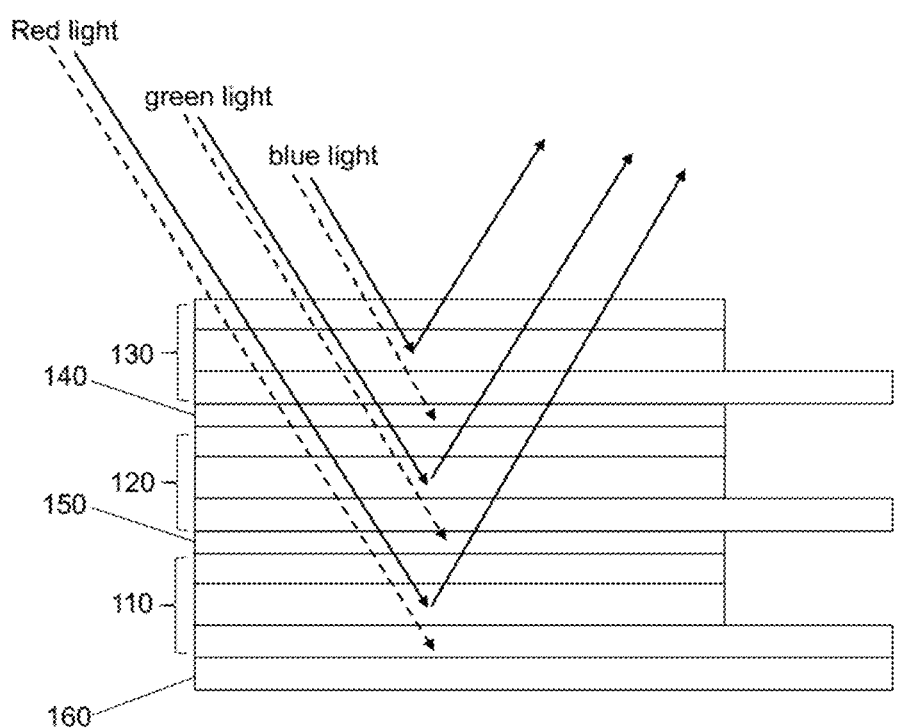
FIG. 1 is a schematically cross section view of the first preferred embodiment of the present invention.

A first preferred embodiment proposed in the present invention proposes is illustrated in FIG. 1, which is a schematically cross section view of a cholesteric liquid crystal display 1. The cholesteric liquid crystal display 1 comprising three stacked selective light reflection modules. A first selective light reflection module 110 for reflecting a first light, a second selective light reflection module 120 for reflecting a second light, and a third selective light reflection module 130 for reflecting a third light, are sequentially stacked from bottom to top. The wavelength ranges of the first light, the second light, and the third light are different. As a preferred embodiment, the first selective light reflection module 110 is but not limited to a red cholesteric liquid crystal module, the second selective light reflection module 120 is but not limited to a green cholesteric liquid crystal module, the third selective light reflection module 130 is but not limited to a blue cholesteric liquid crystal module, while the first light is red light, the second light is green light, and the third light is blue light.

The incident light goes into the cholesteric liquid crystal display 1 from the top of the blue cholesteric liquid crystal module 130. The light goes into the blue cholesteric liquid crystal module 130 and partly reflected by the blue cholesteric liquid crystal module 130. The remaining light which passed through the blue cholesteric liquid crystal module 130 goes into the green cholesteric liquid crystal module 120, and then is partly reflected by the green cholesteric liquid crystal module 120. The remaining light which passed through the green cholesteric liquid crystal module 120 goes into the red cholesteric liquid crystal module 110, and then is partly reflected by the red cholesteric liquid crystal module 110.

It should be understood that the cholesteric liquid crystal molecule has a feature of optical rotation. Generally, for a single layer of cholesteric liquid crystal cell, it is provided with only one direction of optical rotation, either left rotation or right rotation. When a single layer of cholesteric liquid crystal cell is activated to reflect light, there is only half of the light reflecting while the other half of the light passing through cholesteric liquid crystal cell. The resulting contrast ratio and image definition of the display is therefore affected.

For a conventional three-layer cholesteric liquid crystal display which comprising stacked red, green and blue cholesteric liquid crystal modules from bottom to top, the contrast ratio and definition of image is more seriously affected. When external light goes into the blue cholesteric liquid crystal module, only half of blue light is reflected while the other half of blue light passes through the blue cholesteric liquid crystal module and goes into the green cholesteric liquid crystal module. It affects the contrast ratio and image definition of the green cholesteric liquid crystal module. Similarly, when light goes into the green cholesteric liquid crystal module, there is only half of green light being reflected while the other half of green light passes through the green cholesteric liquid crystal module and goes into the red cholesteric liquid crystal module. It affects the contrast ratio and image definition of the red cholesteric liquid crystal module.

To overcome the aforementioned problem, the proposed cholesteric liquid crystal display 1 in the first preferred embodiment further comprises a first thin-film photovoltaic module 140 and a second thin-film photovoltaic module 150. The first thin-film photovoltaic module 140 is disposed between the blue cholesteric liquid crystal module 130 and the green cholesteric liquid crystal module 120. The second thin-film photovoltaic module 150 is disposed between the green cholesteric liquid crystal module 120 and the red cholesteric liquid crystal module 110.

The incident light goes into the first thin-film photovoltaic module 140 from the lower surface of the blue cholesteric liquid crystal module 130 and the upper surface of the first thin-film photovoltaic module 140. The first thin-film photovoltaic module 140 is partially photo-permeable in which the transmittance of blue light is lower than the transmittance of the other lights. The first thin-film photovoltaic module 140 is provided for absorbing the leaked blue light which passed through the blue cholesteric liquid crystal module 130, and allowing the other light passing through it. In order to achieve the purpose, the first thin-film photovoltaic module 140 is preferably selected as a specific dye sensitized solar cell module which comprising first dye sensitizers being specifically responsible for harvesting blue light to conduct photovoltaic reaction.

Specific semiconducting material is necessarily comprised in dye sensitized solar cell. The first thin-film photovoltaic module 140 comprises a first semiconducting material. When the first thin-film photovoltaic module 140 is a n-type dye sensitized solar cell module, Titanium Dioxide $TiO_2$, Niobium Pentoxide $Nb_2O_5$, Zinc Oxide ZnO, Tin Oxide $SnO_2$, or a combination of the above may be applied as the first semiconducting material. When the first thin-film photovoltaic module 140 is a p-type dye sensitized solar cell module, Nickel Oxide NiO, Cuprous Oxide $Cu_2O$, or a combination of the above may be applied as the first semiconducting material.

Regarding the second thin-film photovoltaic module 150, the incident light going into the second thin-film photovoltaic module 150 is from the lower surface of the green cholesteric liquid crystal module 120 and the upper surface of the second thin-film photovoltaic module 150. The second thin-film photovoltaic module 150 is partially photo-permeable in which the transmittance of green light is lower than the transmittance of the other lights. The second thin-film photovoltaic module 150 is provided for absorbing the remaining green light which passed through the green cholesteric liquid crystal module, and allowing the other light passing through it. In order to achieve the purpose, the second thin-film photovoltaic module 150 is preferably selected as a specific dye sensitized solar cell module which comprising second dye sensitizers being specifically responsible for harvesting green light to conduct photovoltaic reaction.

As described above, specific semiconducting material is necessarily comprised in dye sensitized solar cell. The second thin-film photovoltaic module 150 comprises a second semiconducting material. When the second thin-film photovoltaic module 150 is a n-type dye sensitized solar cell module, Titanium Dioxide $TiO_2$, Niobium Pentoxide $Nb_2O_5$, Zinc Oxide ZnO, Tin Oxide $SnO_2$, or a combination of the above may be applied as the second semiconducting material. When the second thin-film photovoltaic module 140 is a p-type dye sensitized solar cell module, Nickel Oxide NiO, Cuprous Oxide $Cu_2O$, or a combination of the above may be applied as the second semiconducting material.

It should be noted that both p-type dye sensitized solar cell modules or both n-type dye sensitized solar cell modules may be applied for the first thin-film photovoltaic module 140 and the second thin-film photovoltaic module 150. Surely, the second thin-film photovoltaic module 150 might apply different p-type/n-type dye sensitized solar cell module from the first thin-film photovoltaic module 140.

Via the first thin-film photovoltaic module 140, the leaked blue light which passed through the blue cholesteric liquid crystal module 130 is absorbed and applied for generating additional electricity. The remaining light then going into the green cholesteric liquid crystal module 120 for reflection is therefore much clear. Via the second thin-film photovoltaic module 150, the leaked green light which passed through the green cholesteric liquid crystal module 120 is absorbed and applied for generating additional electricity. The remaining light then going into the red cholesteric liquid crystal module 110 for reflection is therefore much clear. Hence, the image quality of the cholesteric liquid crystal display 1 is improved.

Via the first thin-film photovoltaic module 140 and second thin-film photovoltaic module 150, the leaked blue light and leaked green light is not only absorbed but also applied for generating additional electricity. The additional electricity might be stored for driving and/or controlling the cholesteric liquid crystal display 1. The additional electricity may also be applied for powering other external devices.

Referring to the optical rotation, there is half of red light would pass through the red cholesteric liquid crystal module 110. As depicted in FIG. 1, an alternative embodiment is provided. The cholesteric liquid crystal display 1 further comprises a light absorption module 160 disposed below the red cholesteric liquid crystal module 110 for absorbing any leaked light which passed through the red cholesteric liquid crystal module 110. The contrast ratio is therefore improved.

As an alternative embodiment, the light absorption module 160 comprises a layer of light absorption material, for example, a black sponge.

As an alternative embodiment, the light absorption module 160 may be a photovoltaic module to conduct photovoltaic reaction for generating electricity. Such photovoltaic module may use a crystalline silicon solar cell module because the crystalline silicon solar cell module usually looks dark. However, a thin-film photovoltaic module is also applicable.

Figure 2:
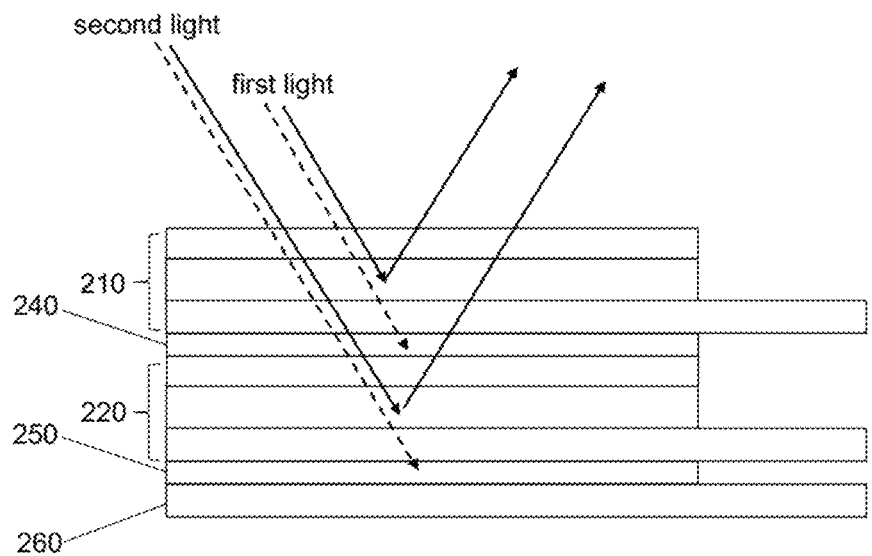
FIG. 2 is a schematically cross section view of the second embodiment of the present invention.

The present invention proposes a second preferred embodiment as illustrated in FIG. 2, which is a schematically cross section view of a cholesteric liquid crystal display 2.

The cholesteric liquid crystal display 2 comprises at least two cholesteric liquid crystal modules. A second cholesteric liquid crystal module 220 and a first cholesteric liquid crystal module 210 are sequentially stacked from bottom to top. The incident light goes into the cholesteric liquid crystal display 2 from the top of the first cholesteric liquid crystal module 210, the remaining light goes out the cholesteric liquid crystal display 2 from the bottom of the second cholesteric liquid crystal module 220.

The first cholesteric liquid crystal module 210 reflects a first light while the second cholesteric liquid crystal module 220 reflects a second light. The wavelength ranges of the first light and the second light are different. For example, when the first cholesteric liquid crystal module 210 is a blue cholesteric liquid crystal module, it reflects blue light; the second cholesteric liquid crystal module 220 may be applied as a green cholesteric liquid crystal module for reflecting green light or a red cholesteric liquid crystal module for reflecting red light.

When the first cholesteric liquid crystal module 210 is a green cholesteric liquid crystal module, it reflects greed light; the second cholesteric liquid crystal module 220 may be applied as a red cholesteric liquid crystal module for reflecting red light. Generally, it is not applicable to apply a red cholesteric liquid crystal module as the first cholesteric liquid crystal module 210. It is because the wavelength and the transmittance. A longer light wavelength results in a lower frequency and a better transmittance. A shorter light wavelength results in a higher frequency and a worse transmittance.

Comparing red/green/blue lights, red light is provided with the longest wavelength and the best transmittance, blue light is provided with the shortest wavelength and the worst transmittance, while green light is provided with the moderate wavelength and the moderate transmittance. Therefore, the blue cholesteric liquid crystal module for reflecting blue light is usually disposed at the top of a multilayer cholesteric liquid crystal display, the red cholesteric liquid crystal module for reflecting red light is usually disposed at the bottom of the multilayer cholesteric liquid crystal display, while the green cholesteric liquid crystal module for reflecting green light is usually disposed between the blue cholesteric liquid crystal module and the red cholesteric liquid crystal module.

The cholesteric liquid crystal display 2 further comprises a first thin-film photovoltaic module 240 which disposed between the first cholesteric liquid crystal module 210 and the second cholesteric liquid crystal module 220. The incident light goes into the first thin-film photovoltaic module 240 from the lower surface of the first cholesteric liquid crystal module 210 and the upper surface of the first thin-film photovoltaic module 240.

It should be noted again that the cholesteric liquid crystal molecules have a feature of optical rotation. When a single cholesteric liquid crystal cell unit is activated to reflect light, at least half of the light will leak and pass through the cholesteric liquid crystal cell without being reflected due to optical rotation. The contrast ratio and image definition of a conventional cholesteric liquid crystal display is therefore affected. The first thin-film photovoltaic module 240 in the cholesteric liquid crystal display 2 is applied for overcoming such problem.

The first thin-film photovoltaic module 240 is a dye sensitized solar cell module which comprising first dye sensitizers being specifically responsible for harvesting the first light, so that the first thin-film photovoltaic module 240 is partially photo-permeable in which the transmittance of the first light is lower than the transmittance of the other lights. When the first cholesteric liquid crystal module 210 is applied as a blue cholesteric liquid crystal module, the first thin-film photovoltaic module 240 is provided for absorbing the leaked blue light which passed through the blue cholesteric liquid crystal module, and allowing the other light passing through it then going into the second cholesteric liquid crystal module 220 which reflecting either green light or red light. When the first cholesteric liquid crystal module 210 is applied as a green cholesteric liquid crystal module, the first thin-film photovoltaic module 240 is provided for absorbing the leaked green light which passed through the green cholesteric liquid crystal module, allowing the other light passing through it then going into the second cholesteric liquid crystal module 220 which reflecting red light. The contrast ratio and image definition of the proposed cholesteric liquid crystal display 2 is therefore improved.

Specific semiconducting material is necessarily comprised in dye sensitized solar cell. As an embodiment, the first thin-film photovoltaic module 240 is a n-type dye sensitized solar cell module. A first semiconducting material comprised in the n-type dye sensitized solar cell module may be Titanium Dioxide $TiO_2$, Niobium Pentoxide $Nb_2O_5$, Zinc Oxide ZnO, Tin Oxide $SnO_2$, or a combination of the above. As an alternative embodiment, the first thin-film photovoltaic module 240 is a p-type dye sensitized solar cell module. A first semiconducting material comprised in the p-type dye sensitized solar cell module may be Nickel Oxide NiO, Cuprous Oxide $Cu_2O$, or a combination of the above.

In order to improve the efficient of light utilization, one embodiment of the cholesteric liquid crystal display 2 further comprises a second thin-film photovoltaic module 250 which disposed below the second cholesteric liquid crystal module 220. The second thin-film photovoltaic module 250 preferably is a dye sensitized solar cell module which comprising second dye sensitizers. The second dye sensitizers are specifically responsible for harvesting the second light which is different from the first light, so the second thin-film photovoltaic module 250 is partially photo-permeable in which the transmittance of the second light is lower than the transmittance of the other lights.

When the second cholesteric liquid crystal module 220 is applied as a green cholesteric liquid crystal module, the second thin-film photovoltaic module 250 is selected to be specifically responsible for harvesting green light, so the transmittance of green light is lower than the transmittance of the other lights. The leaked green light which passed through the second cholesteric liquid crystal module 220 would be absorbed for conducting photovoltaic reaction. The light other than green light then passes through the second thin-film photovoltaic module 250.

When the second cholesteric liquid crystal module 220 is applied as a red cholesteric liquid crystal module, the second thin-film photovoltaic module 250 is selected to be specifically responsible for harvesting red light, so the transmittance of red light is lower than the transmittance of the other lights. The leaked red light which passed through the second cholesteric liquid crystal module 220 would be absorbed for conducting photovoltaic reaction. The light other than red light then passes through the second thin-film photovoltaic module 250.

The second thin-film photovoltaic module 250 is preferably a dye sensitized solar cell module in which some specific semiconducting material is necessarily comprised. As an embodiment, the second thin-film photovoltaic module 250 is a n-type dye sensitized solar cell module. A second semiconducting material comprised in the n-type dye sensitized solar cell module may be Titanium Dioxide $TiO_2$, Niobium Pentoxide $Nb_2O_5$, Zinc Oxide ZnO, Tin Oxide $SnO_2$, or a combination of the above. As an alternative embodiment, the second thin-film photovoltaic module 250 is a p-type dye sensitized solar cell module. A second semiconducting material comprised in the p-type dye sensitized solar cell module may be Nickel Oxide NiO, Cuprous Oxide $Cu_2O$, or a combination of the above.

When the second thin-film photovoltaic module 250 conducts photovoltaic reaction to generate additional electricity. The additional electricity might be stored for driving/controlling the cholesteric liquid crystal display or powering other external devices.

Figure 3:
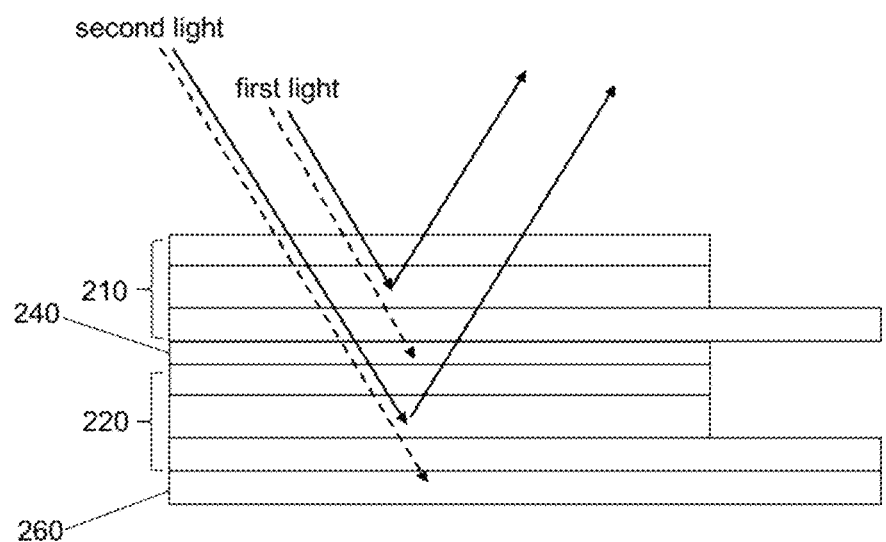
FIG. 3 is a schematically cross section view of the alternative of the second preferred embodiment.

As depicted in FIGS. 2 and 3, an alternative embodiment of the cholesteric liquid crystal display 2 further comprises a light absorption module 260 disposed at the bottom of the cholesteric liquid crystal display 2 in order to absorb the remaining light which passed through the first cholesteric liquid crystal module 210 and the second cholesteric liquid crystal module 220.

For the embodiment in which the second thin-film photovoltaic module 250 is absent as depicted in FIG. 3, the light absorption module 260 is disposed below the second cholesteric liquid crystal module 220. For the embodiment in which the second thin-film photovoltaic module 250 is provided as depicted in FIG. 2, the light absorption module 260 is disposed below the second thin-film photovoltaic module 250.

As an embodiment, the light absorption module 260 comprises a layer of light absorption material, for example, a black sponge.

As an alternative embodiment, the light absorption module 260 may be a crystalline silicon solar cell module to conduct photovoltaic reaction and generate additional electricity. The additional electricity might be stored for driving/controlling the cholesteric liquid crystal display or powering other external devices.

The descriptions illustrated above set forth simply the preferred embodiments of the present invention; however, the characteristics of the present invention are by no means restricted thereto. All equivalent changes, alterations, or modifications conveniently considered by those skilled in the art are deemed to be encompassed within the scope of the following claims.

What is claimed is:

1. A cholesteric liquid crystal display comprising a first selective light reflection module for reflecting a first light, a second selective light reflection module for reflecting a second light, and a third selective light reflection module for reflecting a third light, which sequentially stacked from bottom to top, the incident light going into said cholesteric liquid crystal display from the top of said third selective light reflection module, wherein:

the wavelength ranges of said first light, said second light, and said third light are different;

said cholesteric liquid crystal display further comprises a first thin-film photovoltaic module disposed between said third selective light reflection module and said second selective light reflection module, and a second thin-film photovoltaic module disposed between said second selective light reflection module and said first selective light reflection module;

wherein said first thin-film photovoltaic module is partially photo-permeable in which the transmittance of said third light is lower than the transmittance of the other lights;

wherein said second thin-film photovoltaic module is partially photo-permeable in which the transmittance of said second light is lower than the transmittance of the other lights.

2. The cholesteric liquid crystal display of claim 1, wherein, said first selective light reflection module is a red cholesteric liquid crystal module, said second selective light reflection module is a green cholesteric liquid crystal module, said third selective light reflection module is a blue cholesteric liquid crystal module; said first light is red light, said second light is green light, said third light is blue light.

3. The cholesteric liquid crystal display of claim 1, wherein, said first thin-film photovoltaic module is a dye sensitized solar cell module which comprising first dye sensitizers being specifically responsible for harvesting said third light.

4. The cholesteric liquid crystal display of claim 1, wherein, said first thin-film photovoltaic module is a n-type dye sensitized solar cell module which comprising a first semiconducting material selected from the group consisting of Titanium Dioxide ($TiO_2$), Niobium Pentoxide ($Nb_2O_5$), Zinc Oxide (ZnO), Tin Oxide ($SnO_2$), and a combination of the above.

5. The cholesteric liquid crystal display of claim 2, wherein, said first thin-film photovoltaic module is a p-type dye sensitized solar cell module which comprising a first semiconducting material selected from the group consisting of Nickel Oxide (NiO), Cuprous Oxide ($Cu_2O$), and a combination of the above.

6. The cholesteric liquid crystal display of claim 1, wherein, said second thin-film photovoltaic module is a dye sensitized solar cell module which comprising second dye sensitizers being specifically responsible for harvesting said second light.

7. The cholesteric liquid crystal display of claim 6, wherein, said second thin-film photovoltaic module is a n-type dye sensitized solar cell module which comprising a second semiconducting material selected from the group consisting of Titanium Dioxide ($TiO_2$), Niobium Pentoxide ($Nb_2O_5$), Zinc Oxide (ZnO), Tin Oxide ($SnO_2$), and a combination of the above.

8. The cholesteric liquid crystal display of claim 6, wherein, said second thin-film photovoltaic module is a p-type dye sensitized solar cell module which comprising a second semiconducting material selected from the group consisting of Nickel Oxide (NiO), Cuprous Oxide ($Cu_2O$), and a combination of the above.

9. The cholesteric liquid crystal display of claim 1, further comprising a light absorption module disposed below said first selective light reflection module for absorbing the light passed through said first selective light reflection module.

10. The cholesteric liquid crystal display of claim 9, wherein, said light absorption module is a photovoltaic module.

11. A cholesteric liquid crystal display comprising a first cholesteric liquid crystal module and a second cholesteric liquid crystal module, which sequentially stacked from top to bottom, the incident light going into said cholesteric liquid crystal display from the top of said first cholesteric liquid crystal module, wherein:
said first cholesteric liquid crystal module reflects a first light while said second cholesteric liquid crystal module reflects a second light, wherein the wavelength range of said second light is different from that of said first light;
said cholesteric liquid crystal display further comprises a first thin-film photovoltaic module disposed between said first cholesteric liquid crystal module and said second cholesteric liquid crystal module;
wherein said first thin-film photovoltaic module is partially photo-permeable in which the transmittance of said first light is lower than the transmittance of the other lights.

12. The cholesteric liquid crystal display of claim 11, wherein, said first thin-film photovoltaic module is a dye sensitized solar cell module which comprising first dye sensitizers being specifically responsible for harvesting said first light.

13. The cholesteric liquid crystal display of claim 12, wherein, said first thin-film photovoltaic module is a n-type dye sensitized solar cell module which comprising a first semiconducting material selected from the group consisting of Titanium Dioxide ($TiO_2$), Niobium Pentoxide ($Nb_2O_5$), Zinc Oxide (ZnO), Tin Oxide ($SnO_2$), and a combination of the above.

14. The cholesteric liquid crystal display of claim 12, wherein, said first thin-film photovoltaic module is a p-type dye sensitized solar cell module which comprising a first semiconducting material selected from the group consisting of Nickel Oxide (NiO), Cuprous Oxide ($Cu_2O$), and a combination of the above.

15. The cholesteric liquid crystal display of claim 11, wherein, said first light is selected from the group consisting of blue light and green light, said second light is selected from the group consisting of green light and red light.

16. The cholesteric liquid crystal display of claim 11, further comprising a second thin-film photovoltaic module disposed below said second cholesteric liquid crystal module, said second thin-film photovoltaic module is a dye sensitized solar cell module which comprising second dye sensitizers being specifically responsible for harvesting said second light, so that said second thin-film photovoltaic module is partially photo-permeable in which the transmittance of said second light is lower than the transmittance of the other lights.

17. The cholesteric liquid crystal display of claim 16, wherein, said second thin-film photovoltaic module is a n-type dye sensitized solar cell module which comprising a second semiconducting material selected from the group consisting of Titanium Dioxide ($TiO_2$), Niobium Pentoxide ($Nb_2O_5$), Zinc Oxide (ZnO), Tin Oxide ($SnO_2$), and a combination of the above.

18. The cholesteric liquid crystal display of claim 16, wherein, said second thin-film photovoltaic module is a p-type dye sensitized solar cell module which comprising a second semiconducting material selected from the group consisting of Nickel Oxide (NiO), Cuprous Oxide ($Cu_2O$), and a combination of the above.

19. The cholesteric liquid crystal display of claim 11, further comprising a light absorption module disposed below said second cholesteric liquid crystal module for absorbing the light passed through said second cholesteric liquid crystal module.

20. The cholesteric liquid crystal display of claim 16, further comprising a light absorption module disposed below said second thin-film photovoltaic module for absorbing the light passed through said second thin-film photovoltaic module.

* * * * *